(12) United States Patent
Mathiesen et al.

(10) Patent No.: US 11,232,380 B2
(45) Date of Patent: Jan. 25, 2022

(54) MAPPING ASSESSMENT RESULTS TO LEVELS OF EXPERIENCE

(71) Applicant: Microsoft Technology Licensing, LLC, Redmond, WA (US)

(72) Inventors: Christian V. Mathiesen, Mountain View, CA (US); Emrecan Dogan, Menlo Park, CA (US); Alp Artar, Palo Alto, CA (US); Mustafa Emre Kazdagli, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/359,777

(22) Filed: Mar. 20, 2019

(65) Prior Publication Data
US 2020/0302370 A1    Sep. 24, 2020

(51) Int. Cl.
*G06Q 10/06* (2012.01)
*G06N 20/00* (2019.01)

(52) U.S. Cl.
CPC ..... *G06Q 10/063112* (2013.01); *G06N 20/00* (2019.01); *G06Q 10/06398* (2013.01)

(58) Field of Classification Search
None
See application file for complete search history.

(56) References Cited

U.S. PATENT DOCUMENTS

| | | |
|---|---|---|
| 7,310,626 B2 | 12/2007 | Scarborough et al. |
| 7,778,938 B2 | 8/2010 | Stimac |
| 9,378,486 B2 | 6/2016 | Taylor et al. |
| 10,528,916 B1 | 1/2020 | Taylor et al. |
| 2002/0119433 A1 | 8/2002 | Callender |
| 2003/0191680 A1 | 10/2003 | Dewar |
| 2005/0246299 A1 | 11/2005 | Scarborough et al. |
| 2007/0088601 A1 | 4/2007 | Money et al. |
| 2011/0055098 A1* | 3/2011 | Stewart ............. G06Q 10/1053 705/321 |
| 2012/0084120 A1* | 4/2012 | Hirsch ............... G06Q 30/0203 705/7.32 |
| 2012/0271774 A1 | 10/2012 | Clegg |

(Continued)

OTHER PUBLICATIONS

Gupta, Anika, and Deepak Garg. "Applying data mining techniques in job recommender system for considering candidate job preferences." 2014 International Conference on Advances in Computing, Communications and Informatics (ICACCI). IEEE, 2014. (Year: 2014).*

(Continued)

*Primary Examiner* — Thomas L Mansfield
(74) *Attorney, Agent, or Firm* — Schwegman Lundberg & Woessner, P.A.

(57) ABSTRACT

The disclosed embodiments provide a system for processing data. During operation, the system obtains an assessment result containing a rating of a candidate with respect to a qualification for an opportunity. Next, the system determines, based on the assessment result, a position of the rating in a distribution of assessment results associated with the qualification and one or more attributes of the opportunity. The system then compares the position to a threshold to determine a recommendation related to the candidate and the opportunity. Finally, the system outputs the recommendation in association with the candidate.

18 Claims, 6 Drawing Sheets

(56) References Cited

U.S. PATENT DOCUMENTS

| | | | |
|---|---|---|---|
| 2014/0122355 A1* | 5/2014 | Hardtke | G06Q 10/105 705/321 |
| 2015/0235160 A1* | 8/2015 | Larlus-Larrondo | G06Q 10/06398 705/7.42 |
| 2015/0302436 A1* | 10/2015 | Reynolds | G06Q 30/0201 705/7.32 |
| 2016/0162478 A1* | 6/2016 | Blassin | G06Q 10/063112 706/12 |
| 2016/0196534 A1* | 7/2016 | Jarrett | G06Q 10/1053 705/321 |
| 2017/0235848 A1* | 8/2017 | Van Dusen | G06F 16/904 705/12 |
| 2017/0249595 A1* | 8/2017 | Krupa | G06Q 30/0201 |
| 2018/0005191 A1 | 1/2018 | Metrewar et al. | |
| 2018/0133900 A1* | 5/2018 | Breazeal | B25J 19/026 |
| 2018/0137527 A1* | 5/2018 | Noelting | G06Q 30/0203 |
| 2018/0308062 A1* | 10/2018 | Quitmeyer | G06Q 10/1053 |
| 2019/0114593 A1* | 4/2019 | Champaneria | G06F 16/3325 |
| 2019/0122236 A1* | 4/2019 | Terry | G06N 5/02 |
| 2019/0164107 A1 | 5/2019 | Upadhyay et al. | |
| 2019/0188645 A1 | 6/2019 | Monasor et al. | |
| 2020/0167361 A1 | 5/2020 | Rezqui et al. | |
| 2020/0167631 A1* | 5/2020 | Rezgui | G06F 8/30 |
| 2020/0184422 A1 | 6/2020 | Mondal et al. | |
| 2020/0302368 A1 | 9/2020 | Mathiesen et al. | |
| 2020/0302371 A1 | 9/2020 | Mathiesen et al. | |
| 2020/0302397 A1 | 9/2020 | Mathiesen et al. | |

OTHER PUBLICATIONS

"Non Final Office Action issued in U.S. Appl. No. 16/359,761", dated Oct. 27, 2020, 11 Pages.

"Non Final Office Action Issued in U.S. Appl. No. 16/359,793", dated Nov. 4, 2020, 16 Pages.

"Non Final Office Action Issued in U.S. Appl. No. 16/359,757", dated Mar. 25, 2021, 23 Pages.

"Final Office Action issued in U.S. Appl. No. 16/359,761", dated May 21, 2021, 14 Pages.

"Final Office Action issued in U.S. Appl. No. 16/359,793", dated Jun. 4, 2021, 13 Pages.

"Notice of Allowance Issued in U.S. Appl. No. 16/359,793", dated Oct. 1, 2021, 9 Pages.

Barocas, et al., "Fairness and Machine Learning", In Journal of Nips Tutorial, vol. 1, 2017, 253 Pages.

* cited by examiner

MAPPING ASSESSMENT RESULTS TO LEVELS OF EXPERIENCE

RELATED APPLICATIONS

The subject matter of this application is related to the subject matter in a co-pending non-provisional application by the same inventors as the instant application and filed on the same day as the instant application, entitled "Screening-Based Opportunity Enrichment," having Ser. No. 16/359,757 and filing date Mar. 20, 2019.

The subject matter of this application is related to the subject matter in a co-pending non-provisional application by the same inventors as the instant application and filed on the same day as the instant application, entitled "Assessment-Based Qualified Candidate Delivery," having Ser. No. 16/359,761 and filing date Mar. 20, 2019.

The subject matter of this application is also related to the subject matter in a co-pending non-provisional application by the same inventors as the instant application and filed on the same day as the instant application, entitled "Assessment-Based Opportunity Exploration," having serial number TO BE ASSIGNED, and filing date TO BE ASSIGNED.

BACKGROUND

Field

The disclosed embodiments relate to assessment of candidates. More specifically, the disclosed embodiments relate to techniques for mapping assessment results to levels of experience.

Related Art

Online networks commonly include nodes representing individuals and/or organizations, along with links between pairs of nodes that represent different types and/or levels of social familiarity between the entities represented by the nodes. For example, two nodes in an online network may be connected as friends, acquaintances, family members, classmates, and/or professional contacts. Online networks may further be tracked and/or maintained on web-based networking services, such as online networks that allow the individuals and/or organizations to establish and maintain professional connections, list work and community experience, endorse and/or recommend one another, promote products and/or services, and/or search and apply for jobs.

In turn, online networks may facilitate activities related to business, recruiting, networking, professional growth, and/or career development. For example, professionals may use an online network to locate prospects, maintain a professional image, establish and maintain relationships, and/or engage with other individuals and organizations. Similarly, recruiters may use the online network to search for candidates for job opportunities and/or open positions. At the same time, job seekers may use the online network to enhance their professional reputations, conduct job searches, reach out to connections for job opportunities, and apply to job listings. Consequently, use of online networks may be increased by improving the data and features that can be accessed through the online networks.

BRIEF DESCRIPTION OF THE FIGURES

In the figures, like reference numerals refer to the same figure elements.

DETAILED DESCRIPTION

Figure 1:
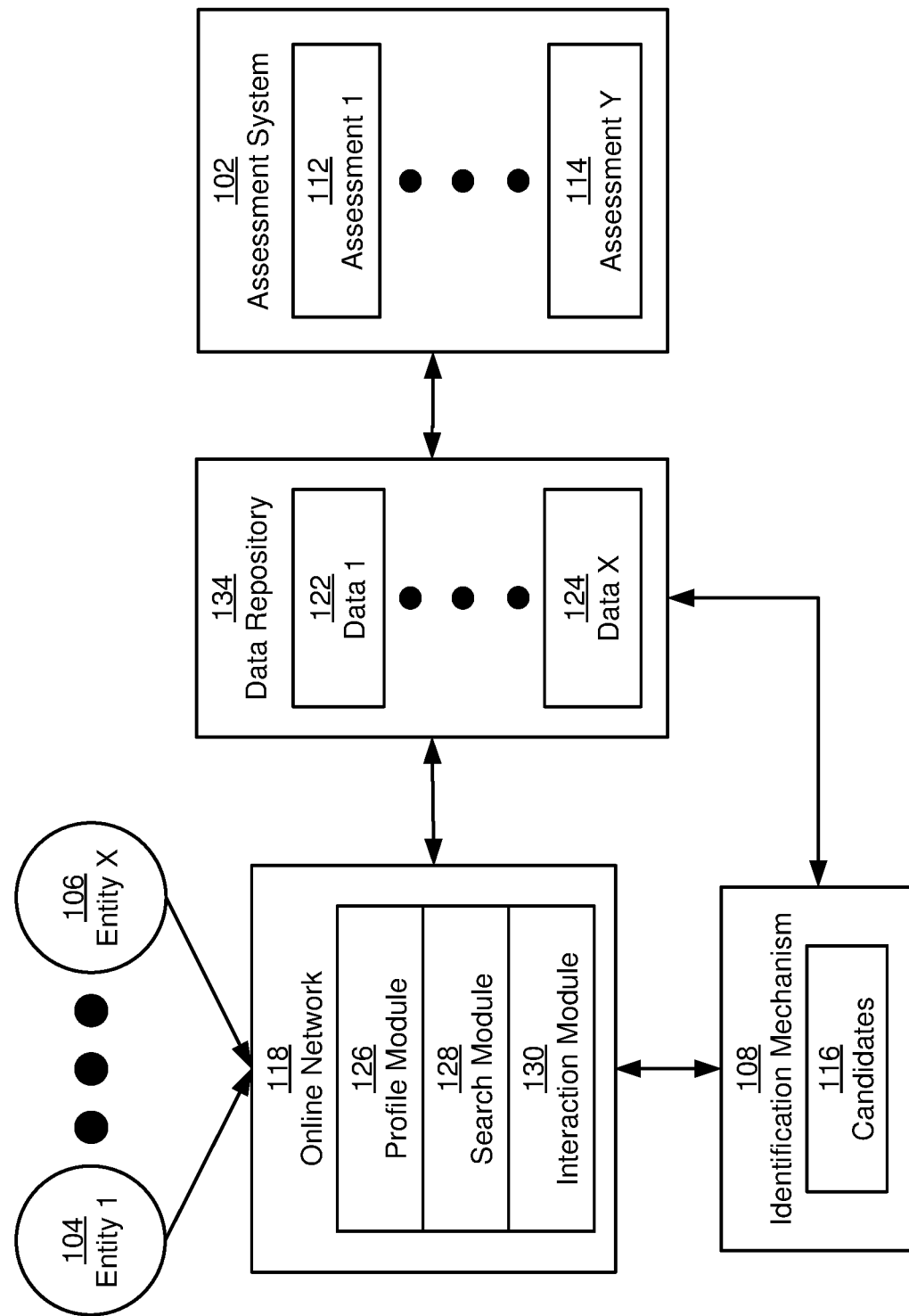
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for using assessments to improve targeting and placement of candidates with opportunities. In these embodiments, assessments include techniques and/or data that are used to determine qualifications of the candidates for the opportunities. For example, an assessment may include a screening question that is presented to a candidate to determine whether the candidate meets a corresponding requirement for a job. In another example, an assessment may include a skill assessment of a candidate, in which the candidate's proficiency in a corresponding skill is determined based on the candidate's answers to a series of questions related to the skill. As a result, assessments can be used to identify highly qualified candidates for the opportunities, thus reducing overhead associated with applying to and/or filling the opportunities.

More specifically, the disclosed embodiments provide a method, apparatus, and system for mapping assessment results to levels of experience. In these embodiments, a candidate's assessment result is compared to a distribution of assessment results and used to generate a recommendation related to the candidate and one or more opportunities. For example, the position of the candidate's rating in a skill assessment may be identified in a distribution of ratings associated with the same skill assessment and one or more attributes related to the candidate and/or a job (e.g., the candidate and/or job's title, company, location, industry, years of experience with the skill, and/or level of seniority). The distribution may optionally be updated to reflect a different set of ratings associated with one or more other attributes, such as a different employer, location, title, amount of experience with the skill, and/or seniority. After the distribution is updated, the position of the candidate's rating in the updated distribution may be recalculated.

When the rating exceeds a threshold, a recommendation related to the candidate and job is generated and/or outputted. For example, the recommendation may be transmitted to the candidate and indicate that the candidate has a high likelihood of receiving a response from a moderator of the job after applying to the job. In another example, the recommendation may be transmitted to the moderator and indicate that the candidate is highly qualified and/or a good fit for the job. In a third example, the recommendation may include the candidate's position in the distribution of assessment results, which may allow the moderator to objectively assess the candidate's qualifications regarding a requirement for a job, such as a number of years of experience in the assessed skill.

By matching assessment results to levels of experience for different sets of users and/or user attributes, the disclosed embodiments may identify qualified candidates for opportunities in a way that is decoupled from years of experience reported by the candidates and/or required by moderators of the opportunities. In turn, recommendations and/or outcomes related to the opportunities and candidates may be more relevant or accurate than recommendations that do not reflect the relative performance of the candidates in assessments, in comparison with a pool of similar users and/or users with attributes that match those of the opportunities. In contrast, conventional techniques may lack the ability to compare the candidates with users that are representative of opportunities for which the candidates may be considered. Instead, moderators of the opportunities may be required to identify qualified candidates based on the candidates' self-reported years or levels of experience with job requirements, which can be subjective and/or incorrect. Consequently, the disclosed embodiments may improve computer systems, applications, user experiences, tools, and/or technologies related to user recommendations, employment, recruiting, and/or hiring.

Mapping Assessment Results to Levels of Experience

FIG. 1 shows a schematic of a system in accordance with the disclosed embodiments. As shown in FIG. 1, the system may include an online network 118 and/or other user community. For example, online network 118 may include an online professional network that is used by a set of entities (e.g., entity 1 104, entity x 106) to interact with one another in a professional and/or business context.

The entities may include users that use online network 118 to establish and maintain professional connections, list work and community experience, endorse and/or recommend one another, search and apply for jobs, and/or perform other actions. The entities may also include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 may be tracked and stored in a database, data warehouse, cloud storage, and/or other data-storage mechanism providing data repository 134.

Data in data repository 134 may then be used to generate recommendations and/or other insights related to listings of jobs or opportunities within online network 118. For example, one or more components of online network 118 may track searches, clicks, views, text input, conversions, and/or other feedback during the entities' interaction with a job search tool in online network 118. The feedback may be stored in data repository 134 and used as training data for one or more machine learning models, and the output of the machine learning model(s) may be used to display and/or otherwise recommend a number of job listings to current or potential job seekers in online network 118.

More specifically, data in data repository 134 and one or more machine learning models are used to produce rankings of candidates associated with jobs or opportunities listed within or outside online network 118. As shown in FIG. 1, an identification mechanism 108 identifies candidates 116 associated with the opportunities. For example, identification mechanism 108 may identify candidates 116 as users who have viewed, searched for, and/or applied to jobs, positions, roles, and/or opportunities, within or outside online network 118. Identification mechanism 108 may also, or instead, identify candidates 116 as users and/or members of online network 118 with skills, work experience, and/or other attributes or qualifications that match the corresponding jobs, positions, roles, and/or opportunities.

After candidates 116 are identified, profile and/or activity data of candidates 116 may be inputted into the machine learning model(s), along with features and/or characteristics of the corresponding opportunities (e.g., required or desired skills, education, experience, industry, title, etc.). In turn, the machine learning model(s) may output scores representing the strengths of candidates 116 with respect to the opportunities and/or qualifications related to the opportunities (e.g., skills, current position, previous positions, overall qualifications, etc.). For example, the machine learning model(s) may generate scores based on similarities between the candidates' profile data with online network 118 and descriptions of the opportunities. The model(s) may further adjust the scores based on social and/or other validation of the candidates' profile data (e.g., endorsements of skills, recommendations, accomplishments, awards, patents, publications, reputation scores, etc.). The rankings may then be generated by ordering candidates 116 by descending score.

In turn, rankings based on the scores and/or associated insights may improve the quality of candidates 116, recommendations of opportunities to candidates 116, and/or recommendations of candidates 116 for opportunities. Such rankings may also, or instead, increase user activity with online network 118 and/or guide the decisions of candidates 116 and/or moderators involved in screening for or placing the opportunities (e.g., hiring managers, recruiters, human resources professionals, etc.). For example, one or more components of online network 118 may display and/or otherwise output a member's position (e.g., top 10%, top 20 out of 138, etc.) in a ranking of candidates for a job to encourage the member to apply for jobs in which the member is highly ranked. In a second example, the component(s) may account for a candidate's relative position in rankings for a set of jobs during ordering of the jobs as search results in response to a job search by the candidate. In a third example, the component(s) may recommend highly ranked candidates for a position to recruiters and/or other moderators as potential applicants and/or interview candidates for the position. In a fourth example, the component(s) may recommend jobs to a candidate based on the predicted relevance or attractiveness of the jobs to the candidate and/or the candidate's likelihood of applying to the jobs.

In one or more embodiments, rankings and/or recommendations related to candidates 116 and/or opportunities are generated based on assessments (e.g., assessment 1 112, assessment y 114) of candidates 116 with respect to the opportunities. Such assessments include techniques and/or data for verifying or ascertaining the qualifications of candidates 116 for the opportunities.

In one or more embodiments, assessments include screening questions that are presented to some or all candidates 116 for a given opportunity to determine whether candidates 116 meet requirements for the opportunity. Each screening question may specify a parameter and a condition associated with the parameter. For example, the screening question may ask a candidate to provide the number of years of experience he or she has with a skill (e.g., "How many years of programming experience do you have?"), tool (e.g., "How many years of work experience do you have using Microsoft Office?"), and/or other type of parameter representing a job-related qualification. In another example, a screening question may ask the candidate to provide a yes/no answer related to a language (e.g., "Do you speak Spanish?"), work authorization (e.g., "Are you authorized to work in the United States?"), license or certification (e.g., "Do you have a license or certification in CPR & AED"), location (e.g., "Are you willing to relocate to the SF Bay Area?"), and/or security clearance (e.g., "Do you possess a security clearance with the United States government?"), and/or other type of parameter representing a job-related qualification.

A candidate's answer to a screening question may then be compared with a value, range of values, set of values, and/or threshold associated with the corresponding parameter or qualification to identify one or more jobs for which the candidate is qualified or not qualified. For example, the candidate may be prompted to answer a series of screening questions for a specific job; if the candidate's answers to the screening questions meet the job's requirements, the candidate may be allowed to apply for the job. In another example, the candidate may opt in to a setting and/or preference that stores the candidate's previous answers to screening questions. In turn, the stored answers may be used to match the candidate to additional jobs and/or opportunities for which the candidate is qualified.

In one or more embodiments, assessments include skill assessments of candidates 116. Each skill assessment determines the proficiency of candidates 116 in a given skill based on the candidates' answers to a series of questions related to the skill. The skill assessment may be adaptive, in which the difficulty of a subsequent question is selected and/or adjusted based on the correctness of the candidate's answers to previous questions in the skill assessment. After the candidate completes the skill assessment, a numeric rating (or score) for the candidate may be calculated based on the correctness of the candidate's answers to questions in the skill assessment and/or the difficulty of the questions. Consequently, screening questions, skill assessments, and/or other types of assessments can be used to identify highly qualified candidates for the opportunities, thus reducing overhead associated with applying to and/or filling the opportunities.

An assessment system 102 provided by and/or accessed through online network 118 interacts with candidates 116 to perform assessments of candidates 116. For example, assessment system 102 may form a part of a recruiting and/or job search product or tool offered by or through online network 118. As a result, assessment system 102 may integrate with other features of online network 118, such as profile module 126, search module 128, and/or interaction module 130. As a candidate browses and/or searches for jobs and/or other opportunities through online network 118, assessment system 102 may present the candidate with screening questions, skill assessments, and/or other types of assessments related to qualifications of the jobs and/or opportunities. Assessment system 102 may also, or instead, include modules or user-interface elements that allow candidates 116 to voluntarily provide answers to screening questions and/or take skill assessments separately from job searches or job browsing conducted by candidates 116.

In one or more embodiments, online network 118 and/or assessment system 102 include functionality to map assessment results obtained from candidates 116 to levels of experience associated with requirements and/or qualifications of jobs and/or opportunities. For example, online network 118 and/or assessment system 102 may determine the position or quantile of a candidate's skill assessment rating with respect to a distribution of skill assessment ratings for similar candidates and/or users that match attributes of an opportunity (e.g., the opportunity's employer, industry, location, title, seniority, years of experience in the skill, etc.). If the position or quantile exceed a threshold, online network 118 and/or assessment system 102 may recommend the candidate to the moderator of the opportunity and/or recommend the opportunity to the candidate.

Figure 2:
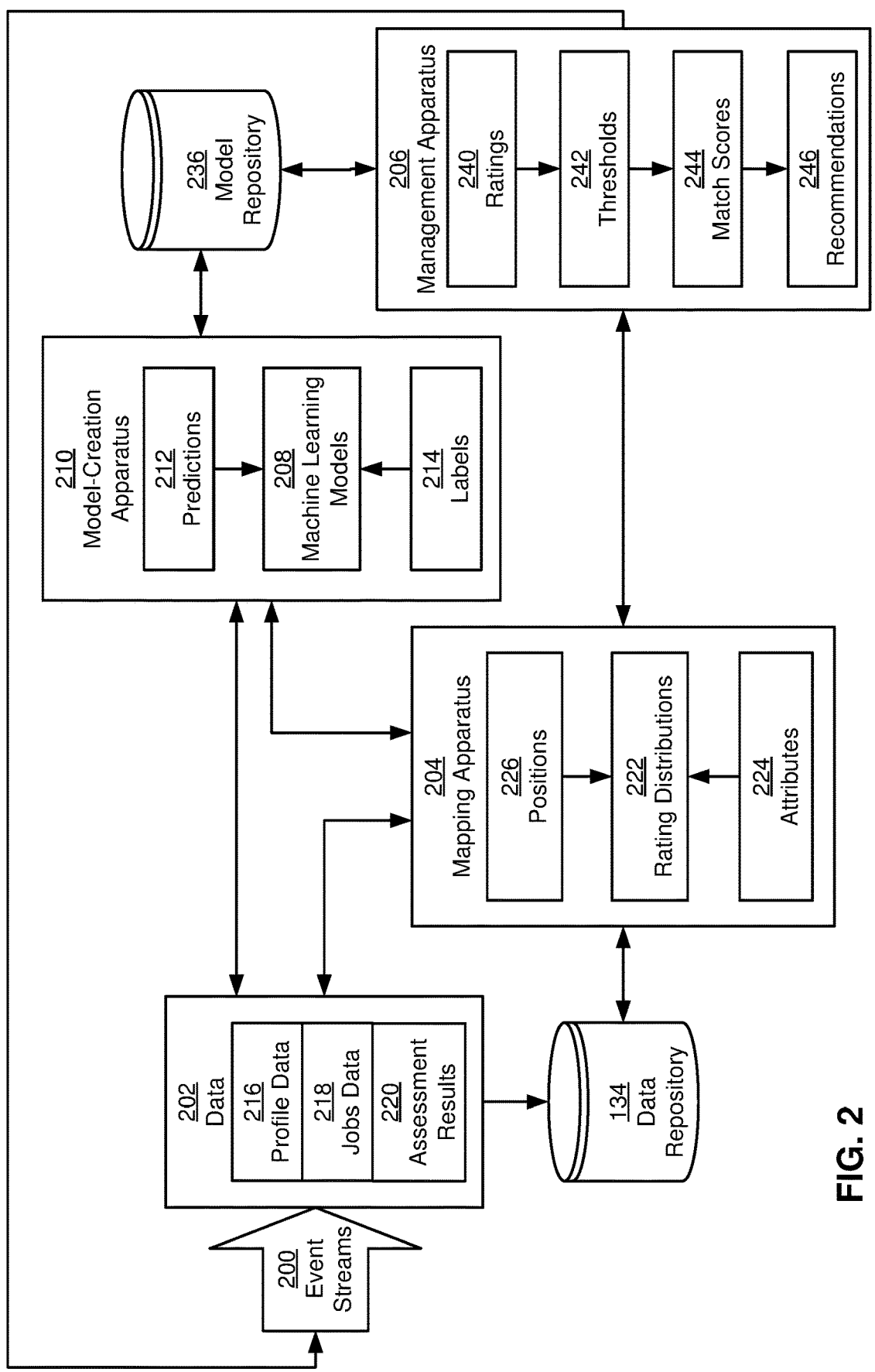
FIG. 2 shows a system for processing data in accordance with the disclosed embodiments.

As shown in FIG. 2, data repository 134 and/or another primary data store may be queried for data 202 that includes profile data 216 for members of an online network (e.g., online network 118 of FIG. 1), as well as jobs data 218 for jobs that are listed or described within or outside the online network. Profile data 216 includes data associated with member profiles in the online network. For example, profile data 216 for an online professional network may include a set of attributes for each user, such as demographic (e.g., gender, age range, nationality, location, language), professional (e.g., job title, professional summary, employer, industry, experience, skills, seniority level, professional endorsements), social (e.g., organizations of which the user is a member, geographic area of residence), and/or educational (e.g., degree, university attended, certifications, publications) attributes. Profile data 216 may also include a set of groups to which the user belongs, the user's contacts and/or connections, awards or honors earned by the user, licenses or certifications attained by the user, patents or publications associated with the user, and/or other data related to the user's interaction with the platform.

Attributes of the members from profile data 216 may be matched to a number of member segments, with each member segment containing a group of members that share one or more common attributes. For example, member segments in the online network may be defined to include members with the same industry, title, location, and/or language.

Connection information in profile data 216 may additionally be combined into a graph, with nodes in the graph representing entities (e.g., users, schools, companies, locations, etc.) in the online network. Edges between the nodes in the graph may represent relationships between the corresponding entities, such as connections between pairs of members, education of members at schools, employment of members at companies, following of a member or company by another member, business relationships and/or partnerships between organizations, and/or residence of members at locations.

Jobs data 218 may include structured and/or unstructured data for job listings and/or job descriptions that are posted and/or provided by members of the online network. For example, jobs data 218 for a given job or job listing may include a declared or inferred title, company, required or desired skills, responsibilities, qualifications, role, location, industry, seniority, salary range, benefits, education level, and/or member segment.

In one or more embodiments, data 202 in data repository 134 includes assessment results 220 for members of the online network and/or candidates (e.g., candidates 116 of FIG. 1) for opportunities posted in the online network. As mentioned above, assessment results 220 may include answers to screening questions by the members and/or candidates. For example, a candidate may answer screening questions as the candidate browses, searches for, and/or interacts with jobs posted in the online network. The candidate may also specify user settings, preferences, and/or permissions that allow the candidate's answers to screening questions to be stored and/or reused to match the candidate to additional jobs.

Assessment results 220 may also, or instead, include ratings 240 that represent the candidates' performance in skill assessments. For example, ratings 240 may include numeric scores that represent the candidates' proficiencies in various skills, which are calculated based on the candidates' performances in skill assessments for the skills. After a candidate takes a skill assessment, the candidate's score for the skill assessment may be stored and/or used to match the candidate with opportunities. The candidate may additionally be restricted from repeating the skill assessment for a certain period after the candidate's most recent attempt to prevent recent experience of the candidate with the skill assessment from unfairly impacting the candidate's performance in a subsequent attempt at the skill assessment.

In one or more embodiments, data repository 134 stores data 202 that represents standardized, organized, and/or classified attributes. For example, skills in profile data 216, jobs data 218, and/or assessment results 220 may be organized into a hierarchical taxonomy that is stored in data repository 134. The taxonomy may model relationships between skills and/or sets of related skills (e.g., "Java programming" is related to or a subset of "software engineering") and/or standardize identical or highly related skills (e.g., "Java programming," "Java development," "Android development," and "Java programming language" are standardized to "Java"). In another example, locations in data repository 134 may include cities, metropolitan areas, states, countries, continents, and/or other standardized geographical regions. In a third example, data repository 134 includes standardized company names for a set of known and/or verified companies associated with the members and/or jobs. In a fourth example, data repository 134 includes standardized titles, seniorities, and/or industries for various jobs, members, and/or companies in the online network. In a fifth example, data repository 134 includes standardized time periods (e.g., daily, weekly, monthly, quarterly, yearly, etc.) that can be used to retrieve profile data 216, jobs data 218, and/or other data 202 that is represented by the time periods (e.g., starting a job in a given month or year, graduating from university within a five-year span, job listings posted within a two-week period, etc.). In a sixth example, data repository 134 includes standardized job functions such as "accounting," "consulting," "education," "engineering," "finance," "healthcare services," "information technology," "legal," "operations," "real estate," "research," and/or "sales."

Data 202 in data repository 134 may further be updated using records of recent activity received over one or more event streams 200. For example, event streams 200 may be generated and/or maintained using a distributed streaming platform such as Apache Kafka (Kafka™ is a registered trademark of the Apache Software Foundation). One or more event streams 200 may also, or instead, be provided by a change data capture (CDC) pipeline that propagates changes to data 202 from a source of truth for data 202. For example, an event containing a record of a recent profile update, job search, job view, job application, response to a job application, connection invitation, post, like, comment, share, and/or other recent member activity within or outside the community may be generated in response to the activity. The record may then be propagated to components subscribing to event streams 200 on a nearline basis.

A mapping apparatus 204 uses assessment results 220 to determine positions 226 of ratings 240 in rating distributions 222 for the corresponding skill assessments. In some embodiments, rating distributions 222 include distributions of assessment results 220 for users that share one or more attributes 224. For example, mapping apparatus 204 may query data repository 134 for skill assessment scores associated with users that share the same title, function, industry, company, location, level of experience in the skill, and/or seniority. Mapping apparatus 204 may produce a rating distribution of the skill assessment scores as a histogram, t-digest, a set of summary statistics (e.g., mean, median, minimum, maximum, range, standard deviation, variance, skew, kurtosis, etc.), a kernel density estimator, and/or another representation of the probability distribution of the skill assessment scores.

In another example, a different component may generate rating distributions 222 in an offline and/or batch-processing basis from assessment results 220 for a large number of users and multiple combinations of attributes 224. The component may store representations of rating distributions 222 in data repository 134, and mapping apparatus 204 may retrieve a given rating distribution from data repository 134 by specifying a given set of attributes 224 as parameters of a query of data repository 134.

In one or more embodiments, attributes 224 used by mapping apparatus 204 to generate and/or retrieve rating distributions 222 and the corresponding positions 226 include one or more attributes in jobs data 218 for a job. For example, mapping apparatus 204 may obtain a candidate's score for a skill assessment and match the skill to a requirement of a job (e.g., a minimum number of years of experience in the skill). Mapping apparatus 204 may retrieve additional attributes 224 (e.g., the job's employer, location, industry, title, function, seniority, etc.) associated with the job from jobs data 218 for the job. Mapping apparatus 204 may also generate one or groupings of the retrieved attributes 224 (e.g., the job's employer and title, the job's title and industry, the job's title, employer, and location, etc.) and obtain or produce rating distributions 222 for the groupings.

Attributes 224 may also, or instead, include attributes that differ from those in jobs data 218. For example, mapping apparatus 204 may vary the employer, location, title, seniority, industry, years of experience in the skill, and/or another attribute associated with a job to produce one or more additional rating distributions 222 that can be used as a basis of comparison with a candidate's rating.

In one or more embodiments, positions 226 include representations of rank and/or order statistics associated with rating distributions 222. For example, mapping apparatus 204 may calculate the position of a candidate's score in a distribution of skill assessment scores as a percentile (e.g., $98^{th}$ percentile), quantile (e.g., in the upper quartile), numeric rank (e.g., $15^{th}$ out of 200 scores), and/or other descriptive statistic that relates the score to the distribution. Thus, positions 226 may characterize the relative performance of a given candidate's assessment result when compared with a pool of similar users and/or users with attributes 224 that match or are related to those of opportunities for which the candidate is considered.

After mapping apparatus 204 generates rating distributions 222 for various groupings of attributes 224 and/or positions 226 of ratings 240 in rating distributions 222, mapping apparatus 204 may store rating distributions 222 and/or positions 226 in data repository 134 for subsequent retrieval and use. Mapping apparatus 204 may also, or instead, provide rating distributions 222 and/or positions 226 to a model-creation apparatus 210, a management apparatus 206, and/or another component of the system for use in creating and/or executing machine learning models 208 and/or recommendations 246.

Model-creation apparatus 210 trains and/or updates one or more machine learning models 208 using sets of features from data repository 134, mapping apparatus 204, and/or another data source; labels 214 associated with the feature sets; and predictions 212 produced by machine learning models 208 from the feature sets. In general, model-creation apparatus 210 may produce machine learning models 208 that generate predictions and/or estimates related to the candidates' compatibility with jobs and/or moderators of the jobs.

First, model-creation apparatus 210 inputs a set of features for each candidate-job pair into one or more machine learning models 208 to obtain a prediction representing a match score (e.g., match scores 244) between the candidate and job. For example, model-creation apparatus 210 may apply a logistic regression model, tree-based model, artificial neural network, and/or other type of machine learning model to the features to produce a score from 0 to 1 that represents the probability of a positive outcome involving the candidate and job (e.g., the moderator of the job responding to the candidate's application to the job, the candidate accepting a message from the moderator, hiring of the candidate for the job, etc.).

Next, model-creation apparatus 210 updates parameters of machine learning models 208 based on differences between match scores 244 and/or other predictions outputted by machine learning model 208 and labels 214 associated with the predictions. For example, model-creation apparatus 210 may obtain and/or generate positive labels 214 for positive outcomes (e.g., views of candidate profiles, messages from moderators to candidates, adding candidates to hiring pipelines, scheduling interviews with candidates, hiring of candidates, etc.) associated with candidate-job pairs. Similarly, model-creation apparatus 210 may obtain and/or generate negative labels 214 for negative outcomes (e.g., rejecting candidates, ignoring candidates, etc.) associated with candidate-job pairs. After labels 214 are obtained or produced, model-creation apparatus 210 may use a training technique and/or one or more hyperparameters to update parameters (e.g., coefficients, weights, etc.) of machine learning models 208 based on features inputted into machine learning models 208 and the corresponding predictions 212 and labels 214.

After machine learning models 208 are created and/or updated, model-creation apparatus 210 stores parameters of machine learning models 208 in a model repository 236. For example, model-creation apparatus 210 may replace old values of the parameters in model repository 236 with the updated parameters, or model-creation apparatus 210 may store the updated parameters separately from the old values (e.g., by storing each set of parameters with a different version number of the corresponding machine learning model).

In one or more embodiments, features inputted into machine learning models 208 include comparisons of the candidates' skill assessment ratings 240 and/or the corresponding positions 226 of ratings 240 in one or more rating distributions 222 with one or more thresholds 242. For example, model-creation apparatus 210 and/or another component may include, in features inputted into one or more machine learning models 208, one or more Boolean values indicating whether or not a candidate's skill assessment score exceeds one or more percentile, numeric, and/or other thresholds representing a minimum, satisfactory, and/or high level of experience in the corresponding skill. Each Boolean value may be set to 1 if a corresponding threshold is met by the candidate's score and to 0 otherwise. As a result, the Boolean values may encode the candidate's relative level of experience in the skill, compared with ratings 240 on the skill assessment for other users that match one or more attributes 224 of a job for which the candidate is considered.

Management apparatus 206 uses machine learning models 208 and/or other techniques to generate recommendations 246 related to candidates and jobs based on ratings 240, positions 226, and/or other data in data repository 134. For example, management apparatus 206 may generate recommendations 246 as search results of the candidates' job searches, search results of recruiters' candidate searches for specific jobs, job recommendations that are displayed and/or transmitted to the candidates, and/or within other contexts related to job seeking, recruiting, careers, and/or hiring.

To generate recommendations 246, management apparatus 206 retrieves, from model repository 236, model-creation apparatus 210, and/or another data source, the latest parameters of one or more machine learning models 208 that generate predictions related to a candidate's compatibility with a job, the likelihood of a positive outcome between the candidate and job, and/or the candidate's strength or quality with respect to requirements or qualifications of the job. Next, management apparatus 206 inputs features related to one or more candidate-job pairs into machine learning models 208 to generate match scores 244 for the candidate-job pairs. For example, management apparatus 206 may produce match scores 244 in an offline, batch-processing, and/or periodic basis (e.g., from batches of features in data repository 134), or management apparatus 206 may generate match scores 244 generated in an online, nearline, and/or on-demand basis (e.g., when a candidate or moderator logs in to the online network, views a job, performs a search, applies for a job, and/or performs another action).

As mentioned above, match scores 244 may be representations of predictions 212 from machine learning models 208. For example, management apparatus 206 may apply a logistic regression model, deep learning model, support vector machine, tree-based model, and/or another type of machine learning model to features for a candidate-job pair to produce a match score from 0 to 1. The match score may represent the likelihood of a positive outcome associated with the candidate and job, such as the candidate receiving a response to his/her application to the job; a moderator of the job viewing the candidate's profile; scheduling of an interview of the candidate for the job; adding of the candidate to a hiring pipeline for the job; and/or hiring of the candidate for the job.

Management apparatus 206 then generates rankings of candidates and/or jobs by the corresponding match scores 244. For example, management apparatus 206 may rank jobs for a candidate by descending predicted likelihood of positively responding to the jobs. In another example, management apparatus 206 may rank candidates for a job by descending predicted likelihood of receiving a message from a moderator of the job, given applications of the candidates to the job.

Finally, management apparatus 206 outputs some or all jobs in the rankings as recommendations 246 to the corresponding candidates 116. For example, management apparatus 206 may display some or all jobs that are ranked by a candidate's descending likelihood of applying to the jobs within a job search tool, email, notification, message, and/or another communication containing job recommendations 246 to the candidate. In another example, management apparatus 206 may rank candidates by descending match score with a job and recommend, to the job's moderator, a pre-specified number or percentile of highest-ranked candidates and/or a variable number of candidates with match scores 244 that exceed a numeric threshold.

Management apparatus 206 also, or instead, uses ratings 240, positions 226, and/or thresholds 242 to filter recommendations 246 based on match scores 244 and/or generate additional recommendations 246 related to the corresponding candidates and/or jobs. For example, management apparatus 206 may output, with each candidate recommended to a moderator for a job, an insight that describes the candidate's position in a relevant distribution of ratings 240 for a skill required by the job (e.g., the percentile of the candidate's score in a distribution of scores for users with the employer, title, function, industry, seniority, required level of experience in the skill, and/or location of the job). In another example, management apparatus 206 may remove candidates that do not meet a minimum threshold representing a required level of experience in the skill from recommendations 246 of candidates to the moderator. In a third example, management apparatus 206 may remove jobs for which a candidate does not meet minimum thresholds for a required level of experience in a skill from job recommendations 246 for the candidate.

Management apparatus 206 and/or another component may additionally track responses to recommendations 246 and/or applications to the corresponding jobs. For example, the component may generate records and/or labels 214 for positive responses such as views of candidate profiles, messages from job moderators to candidates, scheduling of interviews for candidates, adding candidates to hiring pipelines, and/or hiring of candidates. The component may also, or instead, generate records and/or labels 214 for negative responses such as rejections of candidates by moderators and/or lack of action on candidates by the moderators after candidates apply to jobs and/or pass screening questions 240 for the jobs.

In some embodiments, model-creation apparatus 210 and/or management apparatus 206 use labels 214 associated with the responses to update machine learning models 208 and/or recommendations 246. For example, model-creation apparatus 210 may update parameters of machine learning models 208 so that match scores 244 outputted by machine learning models 208 better reflect positive and negative labels 214 for the corresponding outcomes. In another example, management apparatus 206 may adjust thresholds 242 associated with ratings 240 and/or positions 226 of ratings 240 in rating distributions 222 so that recommendations 246 based on thresholds 242 better predict outcomes associated with the corresponding jobs and candidates. As a result, the accuracy and/or relevance of recommendations 246 may improve over time.

By matching assessment results to levels of experience for different sets of users and/or user attributes, the disclosed embodiments may identify qualified candidates for opportunities in a way that is decoupled from years of experience reported by the candidates and/or required by moderators of the opportunities. In turn, recommendations and/or outcomes related to the opportunities and candidates may be more relevant or accurate than recommendations that do not reflect the relative performance of the candidates in assessments, when compared with a pool of similar users and/or users with attributes that match those of the opportunities. In contrast, conventional techniques may lack the ability to compare the candidates with users that are representative of opportunities for which the candidates may be considered. Instead, moderators of the opportunities may be required to identify qualified candidates based on the candidates' self-reported years or levels of experience with job requirements, which can be subjective and/or incorrect. Consequently, the disclosed embodiments may improve computer systems, applications, user experiences, tools, and/or technologies related to user recommendations, employment, recruiting, and/or hiring.

Those skilled in the art will appreciate that the system of FIG. 2 may be implemented in a variety of ways. First, mapping apparatus 204, model-creation apparatus 210, management apparatus 206, data repository 134, and/or model repository 236 may be provided by a single physical machine, multiple computer systems, one or more virtual machines, a grid, one or more databases, one or more filesystems, and/or a cloud computing system. Mapping apparatus 204, model-creation apparatus 210, and management apparatus 206 may additionally be implemented together and/or separately by one or more hardware and/or software components and/or layers.

Second, a number of techniques may be used to generate rating distributions 222, positions 226, match scores 244, recommendations 246, and/or other output used to improve the matching of candidates with jobs or opportunities. As described above, positions 226 and/or rating distributions 222 may be represented using a number of statistical values and/or representations. Similarly, the functionality of machine learning models 208 may be provided by a regression model, artificial neural network, support vector machine, decision tree, naïve Bayes classifier, Bayesian network, clustering technique, collaborative filtering technique, deep learning model, hierarchical model, and/or ensemble model. One or more machine learning models 208 may additionally be customized and/or personalized to reflect the preferences and/or behavior of one or more candidates, moderators, and/or other entities involved in applying or hiring for the opportunities. The retraining or execution of machine learning models 208 may also be performed on an offline, online, and/or on-demand basis to accommodate requirements or limitations associated with the processing, performance, or scalability of the system and/or the availability of features and/or labels 214 used to train the machine learning model 208.

Third, the system of FIG. 2 may be adapted to various types of opportunities and/or candidates. For example, the functionality of the system may be used to match candidates to academic positions, artistic or musical roles, school admissions, fellowships, scholarships, competitions, club or group memberships, matchmaking, collaborations, mentorships, and/or other types of opportunities.

Figure 3:
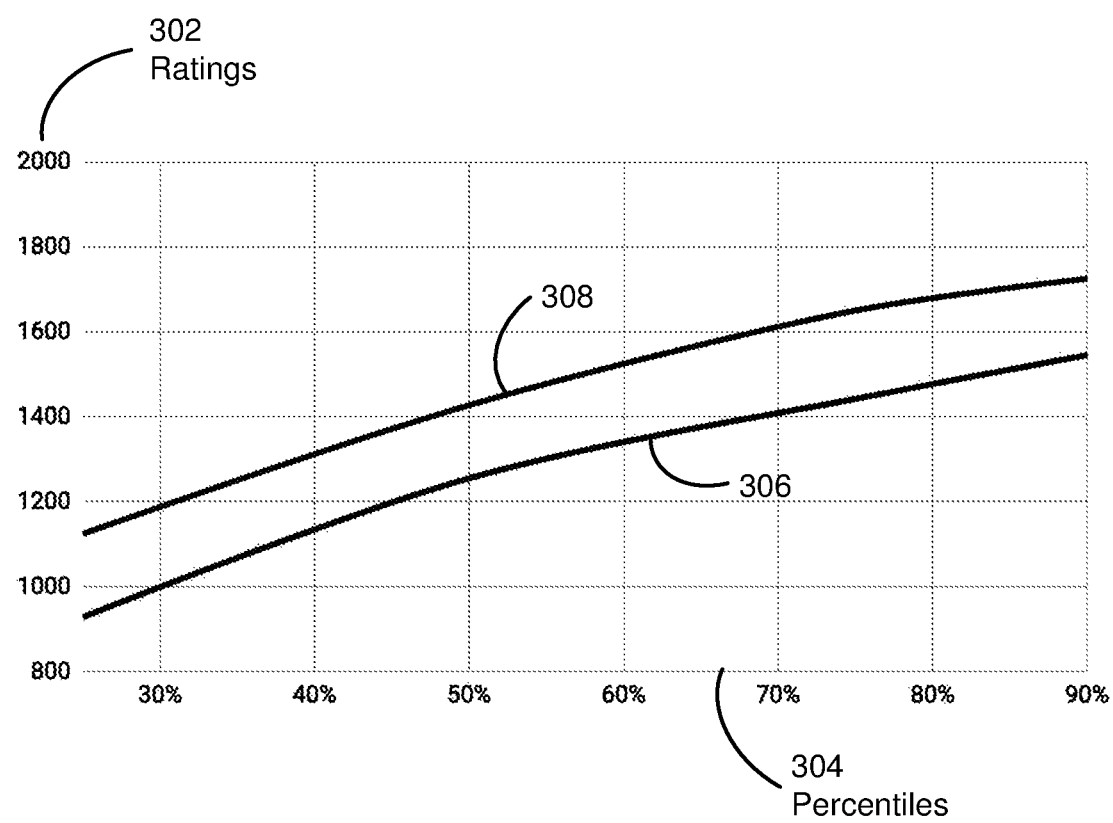
FIG. 3 shows an example plot in accordance with the disclosed embodiments.

FIG. 3 shows an example plot in accordance with the disclosed embodiments. More specifically, FIG. 3 shows a plot of percentiles 304 for ratings 302 of users in an assessment, such as a skill assessment for a particular skill.

As shown in FIG. 3, the plot includes two curves 306 and 308 related to ratings 302 and percentiles 304. Each curve represents a distribution of ratings 302 from users that match one or more attributes. For example, curve 306 may be generated from ratings 302 of users with a certain title, employer, industry, and/or seniority (e.g., users that are Software Engineers at company X), and curve 308 may be generated from ratings 302 of a different set of users with a different title, employer, industry, and/or seniority (e.g., users that are Software Engineers at company Y).

Additional curves in the plot (not shown) may be generated by varying one or more attributes associated with the corresponding users. Continuing with the above example, one or more distributions of scores for the skill assessment may be generated from ratings 302 of users with a different title, seniority, and/or employer as those of curves 306 and/or 308 (e.g., users that are Senior Software Engineers, Staff Software Engineers, and/or Principal Software Engineers within the same company or a different company).

Curves 306 and 308 may be used to determine the position of a given rating in the corresponding distribution of ratings 302. For example, the plot of FIG. 3 may be used to identify a candidate's score of 1400 in the skill assessment as $70^{th}$ percentile in curve 306 and $47^{th}$ percentile in curve 308.

In turn, the position of a given rating in one or both curves 306 and 308 may be used to generate recommendations and/or insights related to the candidate's level of experience in the skill. Continuing with the above example, the $70^{th}$ and $47^{th}$ percentiles of the candidate's score in curves 306 and 308, respectively, may be outputted as insights to a recruiter and/or another moderator of a job that shares one or more attributes (e.g., employer, title, seniority, function, industry, location, etc.) with the distributions represented by one or both curves 306, 308. The insights may allow the recruiter to objectively assess the ability of the candidate's level of experience in the skill with respect to groups of users associated with curves 306, 308 instead of subjectively comparing the candidate's self-reported number of years of experience in the skill with a minimum number of years of experience in the skill for the job.

In another example, the percentile of the candidate's score in one or both curves 306, 308 may be compared to one or more thresholds representing a certain level of experience (e g, minimum, moderate, high, very high, etc.) in the skill. The result of the comparison may then be used to generate and output a recommendation to the job's moderator regarding the candidate (e.g., an indication that the candidate is highly qualified for the job when the candidate's score exceeds a threshold representing a high level of experience, removal of the candidate from a list of recommended candidates for a job when the candidate's score falls below a threshold representing a minimum level of experience, etc.). The result of the comparison may also, or instead, be used to generate and output a recommendation to the candidate regarding the job (e.g., a notification that the candidate is likely to receive a response to his/her application to the job when the candidate's score exceeds a threshold representing a high level of experience, removal of the job from a list of recommended jobs for the candidate when the candidate's score falls below a threshold representing a minimum level of experience, etc.).

Figure 4:
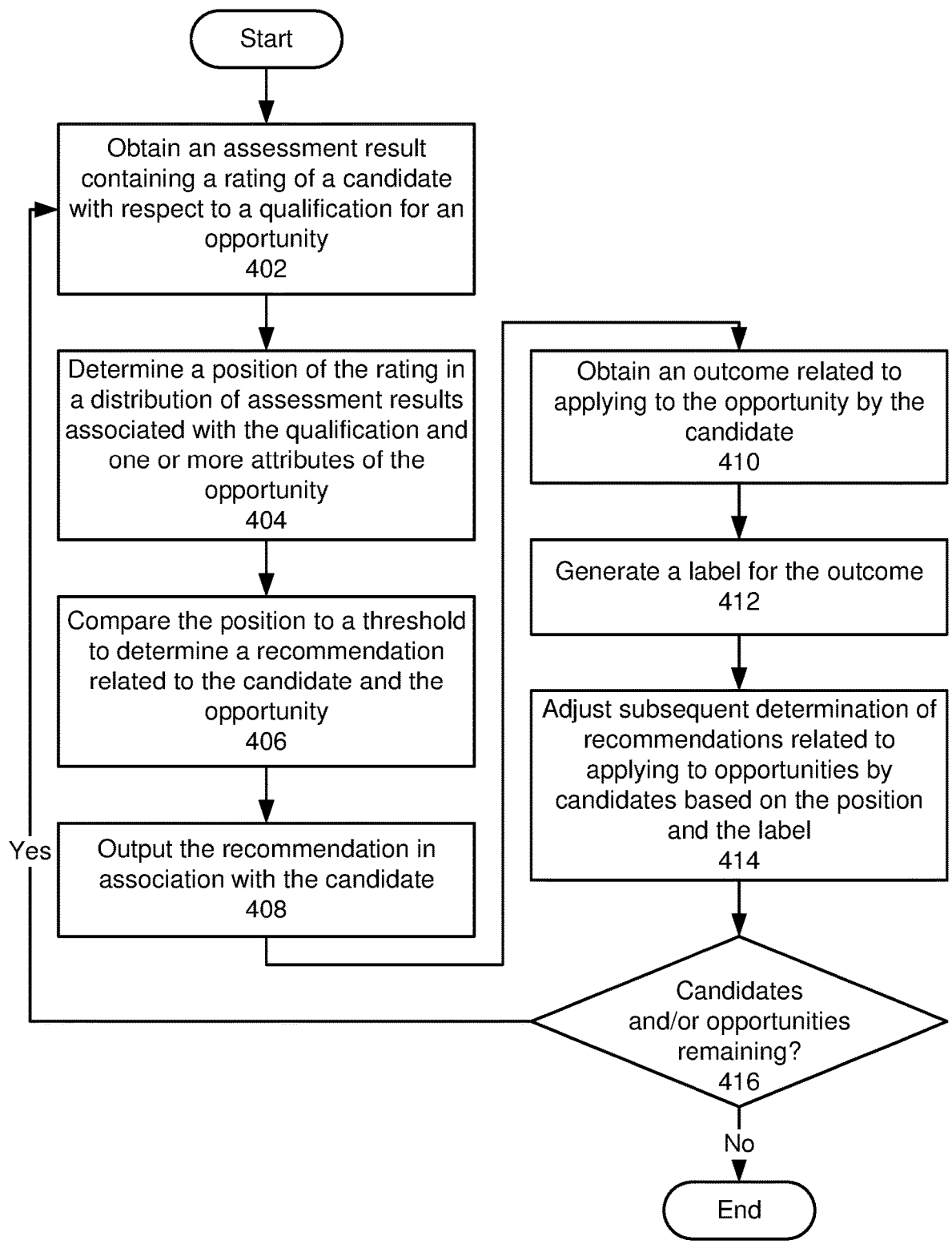
FIG. 4 shows a flowchart illustrating a process of mapping an assessment result to a level of experience in accordance with the disclosed embodiments.

FIG. 4 shows a flowchart illustrating a process of mapping an assessment result to a level of experience in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, an assessment result containing a rating of a candidate with respect to a qualification for an opportunity is obtained (operation 402). For example, the assessment result may include the candidate's score on an adaptive skill assessment for a skill that is required by a job. Next, a position of the rating in a distribution of assessment results associated with the qualification and one or more attributes of the opportunity is determined (operation 404), as described in further detail below with respect to FIG. 5.

The position is compared to a threshold to determine a recommendation related to the candidate and the opportunity (operation 406), and the recommendation is outputted in association with the candidate (operation 408). For example, the threshold may represent a minimum, low moderate, high, and/or expert level of experience in the assessed skill. When the position exceeds a threshold representing a required level of experience in the skill (e.g., a threshold representing an "average" level of experience in users that have the minimum number of years of experience in the skill required by a job), a recommendation indicating a high likelihood of the candidate receiving a response from a moderator of the opportunity after applying to the opportunity may be outputted to the candidate. A notification of a good fit between the candidate and the opportunity may also, or instead, be outputted to the moderator. In another example, the position of the rating in the distribution of assessment results may be outputted to the moderator as an insight that allows the moderator to determine the extent to which the candidate is qualified for the opportunity. In a third example, a Boolean value encoding a comparison of the position with the threshold may be inputted into a machine learning model, and the machine learning model may generate output that includes a match score between the candidate and the opportunity. When the match score exceeds a threshold, the candidate may be recommended to the moderator and/or the job may be recommended to the candidate.

An outcome related to applying to the opportunity by the candidate is obtained (operation 410), and a label for the outcome is generated (operation 412). For example, the outcome may be determined after the candidate applies to the opportunity, is considered by the moderator for the opportunity, and/or otherwise interacts with the opportunity or moderator. In turn, a positive label of 1 may be generated for a positive outcome such as a view of the candidate's profile by the moderator, a message from the moderator to the candidate, adding of the candidate to a hiring pipeline for the opportunity, scheduling of an interview with the candidate by the moderator, and/or hiring of the candidate for the opportunity. Conversely, a negative label of 0 may be generated for a negative outcome such as rejecting and/or ignoring the candidate by the moderator.

Subsequent determination of recommendations related to applying to opportunities by candidates is then adjusted based on the position and the label (operation 414). For example, the label, position of the candidate's rating in the distribution, threshold applied to the position, and/or other data related to the candidate and/or opportunity may be inputted as training data for a machine learning model, and the parameters of the machine learning model may be updated so that predictions outputted by the machine learning model based on the position, threshold, and/or other data reflect the corresponding label. In another example, the threshold used to identify matches between candidates and opportunities may be adjusted to better reflect the outcome and/or label.

Operations 402-414 may be repeated for remaining candidates and/or opportunities (operation 416). For example, recommendations related to a large number of candidate-opportunity pairs may be generated based on the positions of the candidates' assessment results in distributions of assessment results associated with the corresponding opportunities, and outcomes related to the recommendations may be used to improve subsequent recommendations related to the candidate-opportunity pairs. Such generation and update of recommendations may continue until assessment results and/or comparative levels of experience in skills are no longer used to produce predictions and/or recommendations related to applying to opportunities by the candidates.

Figure 5:
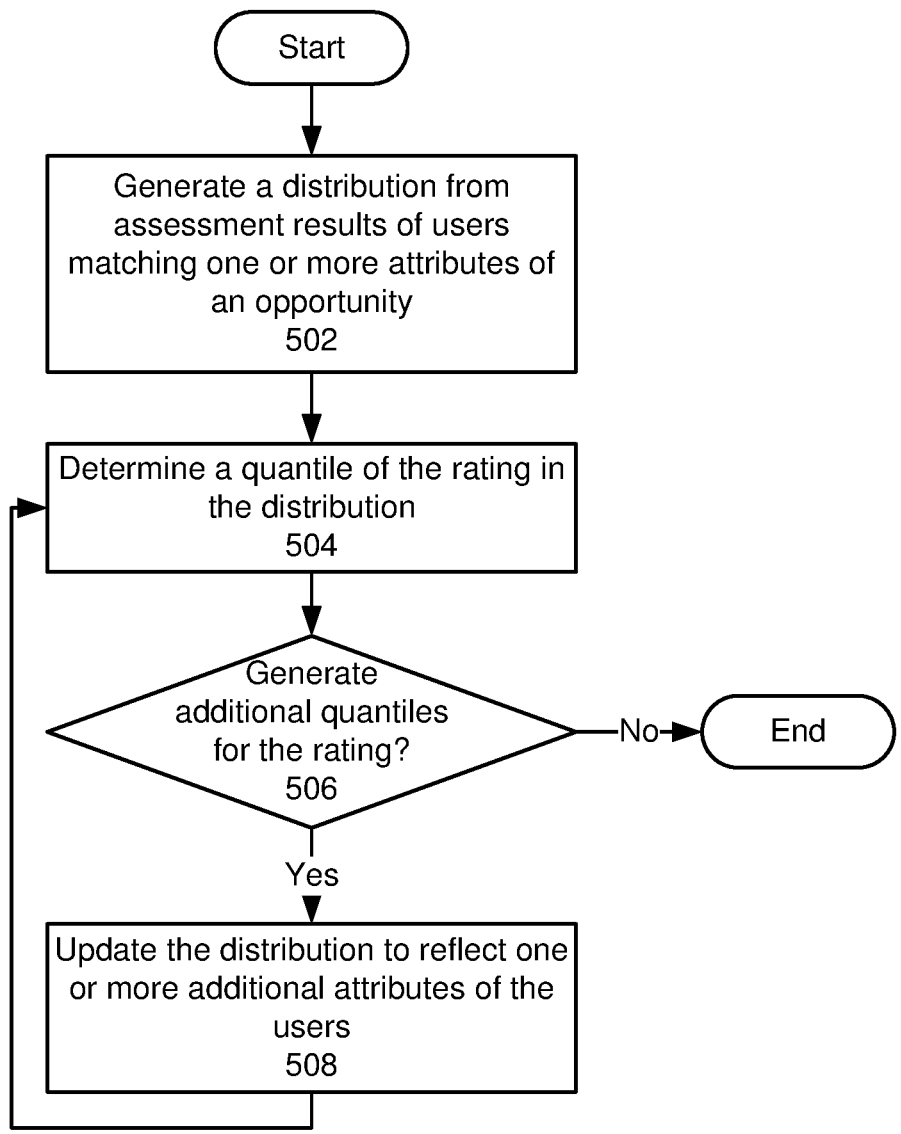
FIG. 5 shows a flowchart illustrating a process of determining a position of a rating in a distribution of assessment results in accordance with the disclosed embodiments.

FIG. 5 shows a flowchart illustrating a process of determining a position of a rating in a distribution of assessment results in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, the distribution is generated from assessment results of users matching one or more attributes of an opportunity (operation 502). For example, the assessment results may be obtained by querying a database and/or another type of repository (e.g., data repository 134 of FIG. 1) for skill assessment scores of users that share an employer, title, function, industry, location, seniority, skill, and/or level of experience in the skill with the job. The distribution may be generated as a histogram, t-digest, set of summary statistics, density estimator, and/or another representation of the probability distribution of the scores.

Next, a quantile of the rating in the distribution is determined (operation 504). Continuing with the previous example, the percentile of a candidate's score in the distribution may be determined using a nearest-rank technique, interpolation technique, weighted percentile technique, and/or another technique.

Additional quantiles for the rating may also be generated (operation 506). For example, multiple percentiles of the rating may be determined from assessment results that match different sets of attributes associated with the opportunity. To generate each additional quantile, the distribution is updated to reflect one or more additional attributes of the users (operation 508). For example, the distribution may be recalculated from scores of users associated with a different employer, title, function, industry, location, seniority, skill, and/or level of experience in the skill than that listed in the job. The rating's quantile is then determined for the recalculated distribution (operation 504).

Operations 504-508 may be repeated to produce multiple quantiles that represent the rating's relative positions within different sets of ratings from users associated with different sets of attributes. In turn, the quantiles may be used to generate and/or modify insights or recommendations related to the candidate and opportunity, as discussed above.

Figure 6:
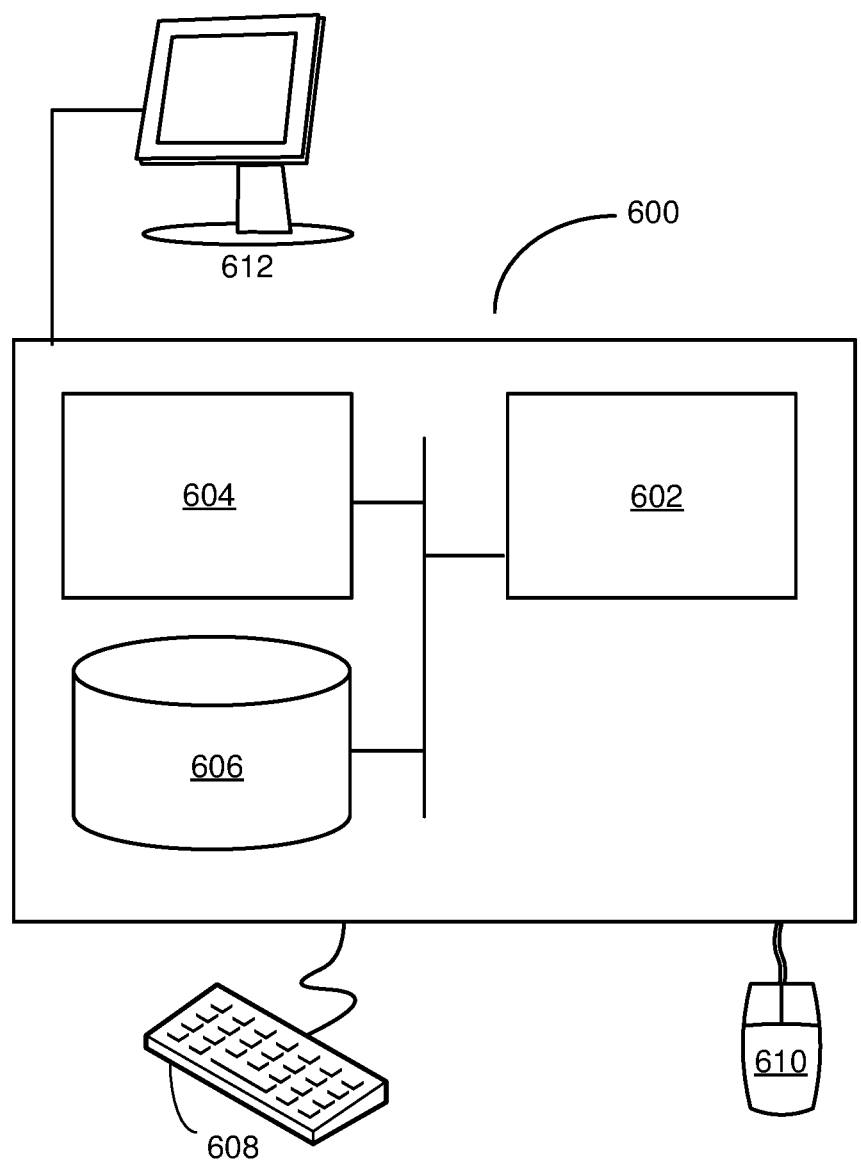
FIG. 6 shows a computer system in accordance with the disclosed embodiments.

FIG. 6 shows a computer system 600 in accordance with the disclosed embodiments. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for processing data. The system includes a model-creation apparatus, a mapping apparatus, and a management apparatus, one or more of which may alternatively be termed or implemented as a module, mechanism, or other type of system component. The mapping apparatus obtains an assessment result containing a rating of a candidate with respect to a qualification for an opportunity. Next, the mapping apparatus determines, based on the assessment result, a position of the rating in a distribution of assessment results associated with the qualification and one or more attributes of the opportunity. The management apparatus then compares the position to a threshold to determine a recommendation related to the candidate and the opportunity. Finally, the management apparatus outputs the recommendation in association with the candidate.

The model-creation apparatus obtains an outcome related applying to the opportunity by the candidate. The model-creation apparatus also generates a label for the outcome and adjusts subsequent determination of recommendations related to applying to opportunities by candidates based on the position and the label.

In addition, one or more components of computer system 600 may be remotely located and connected to the other components over a network. Portions of the present embodiments (e.g., mapping apparatus, model-creation apparatus, management apparatus, data repository, model repository, online network, etc.) may also be located on different nodes of a distributed system that implements the embodiments. For example, the present embodiments may be implemented using a cloud computing system that recommends opportunities to a set of remote candidates within or through an online network.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    obtaining an assessment result comprising a rating of a candidate with respect to a qualification for an employment opportunity;
    determining, by one or more computer systems, a position of the rating in a distribution of assessment results of a plurality of candidates, the distribution of assessment results associated with the qualification of the employment opportunity;
    generating an encoding of a comparison of the position of the rating of the candidate with a threshold, the encoding comprising a Boolean value indicating whether or not the rating of the assessment result of the candidate exceeds the threshold;
    generating a match score for the candidate and the employment opportunity by providing a plurality of input features, including the encoding of the comparison, as input to a machine learned model that has been trained to output the match score;
    generating a recommendation relating to the employment opportunity and the candidate based on the match score; and
    outputting the recommendation.

2. The method of claim 1, further comprising:
    obtaining an outcome related to the candidate applying to the employment opportunity;
    generating a label for the outcome; and
    adjusting the machine learned model based on the position of the rating of the candidate and the label for the outcome.

3. The method of claim 2, wherein generating the label for the outcome comprises:
    generating a positive label for at least one of a profile view of the candidate, a message from a moderator of the employment opportunity to the candidate, scheduling of an interview of the candidate, addition of the candidate to a hiring pipeline for the employment opportunity, and hiring of the candidate for the employment opportunity.

4. The method of claim 2, wherein generating the label for the outcome comprises:
    generating a negative label for at least one of a rejection of the candidate and a lack of action on the candidate by a moderator of the employment opportunity.

5. The method of claim 1, wherein obtaining the assessment result comprises:
    obtaining answers by the candidate to questions in an assessment for the qualification; and
    generating the rating based on the answers.

6. The method of claim 1, wherein determining the position of the rating in the distribution of assessment results comprises:
    generating the distribution from the assessment results of the plurality of candidates, wherein the plurality of candidates are those having profile attributes matching one or more attributes of the employment opportunity; and
    determining a quantile of the rating in the distribution.

7. The method of claim 6, wherein determining the position of the rating in the distribution of assessment results further comprises:
    updating the distribution of the assessment results to reflect an additional attribute of the plurality of candidates; and
    recalculating the quantile of the rating based on the updated distribution.

8. The method of claim 1, wherein the recommendation comprises at least one of:
  an indication of a high likelihood of the candidate receiving a response from a moderator of the employment opportunity after applying to the employment opportunity; and
  a notification to the moderator of a good fit between the candidate and the employment opportunity.

9. The method of claim 1, wherein the recommendation comprises information indicating the position of the rating of the candidate in the distribution of assessment results.

10. The method of claim 1, wherein the plurality of input features comprise at least one of:
  a title;
  a company;
  a location;
  an industry;
  a skill;
  a level of experience in the skill; and
  a seniority.

11. A system, comprising:
  one or more processors; and
  memory storing instructions that, when executed by the one or more processors, cause the system to:
  obtain an assessment result comprising a rating of a candidate with respect to a qualification for an employment opportunity;
  determine a position of the rating in a distribution of assessment results of a plurality of candidates, the distribution of assessment results associated with the qualification of the employment opportunity;
  generate an encoding of a comparison of the position of the rating of the candidate with a threshold, the encoding comprising a Boolean value indicating whether or not the rating of the assessment result of the candidate exceeds the threshold;
  generate a match score for the candidate and the employment opportunity by providing a plurality of input features, including the encoding of the comparison, as input to a machine learned model that has been trained to output the match score;
  generating a recommendation relating to the employment opportunity and the candidate based on the match score; and
  output the recommendation.

12. The system of claim 11, wherein the memory further stores instructions that, when executed by the one or more processors, cause the system to:
  obtain an outcome related to the candidate applying to the employment opportunity;
  generate a label for the outcome; and
  adjust the machine learned model based on the position of the rating of the candidate and the label for the outcome.

13. The system of claim 11, wherein the memory further stores instructions that, when executed by the one or more processors, cause the system to:
  obtain answers by the candidate to questions in an assessment for the qualification; and
  generate the rating based on the answers.

14. The system of claim 11, wherein the memory further stores instructions that, when executed by the one or more processors, cause the system to:
  generate the distribution from the assessment results of the plurality of candidates, wherein the plurality of candidates are those having one or more profile attributes that match one or more attributes of the employment opportunity; and
  determine a quantile of the rating in the distribution.

15. The system of claim 14, wherein the memory further stores instructions that, when executed by the one or more processors, cause the system to:
  update the distribution of the assessment results to reflect an additional attribute of the plurality of candidates; and
  recalculating the quantile of the rating based on the updated distribution.

16. The system of claim 11, wherein the recommendation comprises at least one of:
  an indication of a high likelihood of the candidate receiving a response from a moderator of the employment opportunity after applying to the employment opportunity;
  a notification to the moderator of a good fit between the candidate and the employment opportunity; and
  the position of the rating in the distribution of assessment results.

17. The system of claim 11, wherein the plurality of input features comprise at least one of:
  a title;
  a company;
  a location;
  an industry;
  a skill;
  a level of experience in the skill; and
  a seniority.

18. A non-transitory computer-readable storage medium storing instructions that when executed by a computer cause the computer to perform a method, the method comprising:
  obtaining an assessment result comprising a rating of a candidate with respect to a qualification for an employment opportunity;
  determining a position of the rating in a distribution of assessment results of a plurality of candidates, the distribution of assessment results associated with the qualification employment opportunity;
  generating an encoding of a comparison of the position of the rating of the candidate with a threshold, the encoding comprising a Boolean value indicating whether or not the rating of the assessment result of the candidate exceeds the threshold;
  generating a match score for the candidate and the employment opportunity by providing a plurality of input features, including the encoding of the comparison, as input to a machine learned model that has been trained to output the match score;
  generating a recommendation relating to the employment opportunity and the candidate based on the match score; and
  outputting the recommendation in association with the candidate.

* * * * *